(12) United States Patent
Lewis (10) Patent No.: US 7,900,948 B2
(45) Date of Patent: Mar. 8, 2011

(54) BICYCLE FORKS, CROWN, AND STEERER TUBE ASSEMBLY

(75) Inventor: Barry Lewis, Waterloo, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 174 days.

(21) Appl. No.: 12/269,978

(22) Filed: Nov. 13, 2008

(65) Prior Publication Data

US 2010/0117330 A1    May 13, 2010

(51) Int. Cl.
B62K 21/04 (2006.01)
(52) U.S. Cl. ........ 280/276; 280/279; 280/280; 74/551.1; 74/551.3; 74/551.6; 74/551.8
(58) Field of Classification Search .................. 280/276, 280/279, 280; 74/551.1, 551.3, 551.6, 551.8
See application file for complete search history.

(56) References Cited

U.S. PATENT DOCUMENTS

| | | | |
|---|---|---|---|
| 1,511,350 A * | 10/1924 | Meiselbach | 280/280 |
| 4,068,858 A | 1/1978 | Harrison et al. | |
| 5,002,297 A | 3/1991 | Klein | |
| 5,060,961 A * | 10/1991 | Bontrager | 280/279 |
| 5,078,417 A | 1/1992 | Mouritsen | |
| 5,273,301 A | 12/1993 | Klein | |
| 5,290,052 A * | 3/1994 | Bontrager | 280/279 |
| 5,487,553 A | 1/1996 | Pileggi | |
| 5,540,457 A | 7/1996 | Johnson | |
| 5,609,349 A | 3/1997 | Buckmiller et al. | |
| 5,653,007 A | 8/1997 | Boyer et al. | |
| 5,692,764 A | 12/1997 | Klein et al. | |
| 5,762,352 A | 6/1998 | Lee | |
| 5,944,932 A | 8/1999 | Klein et al. | |
| 6,267,399 B1 * | 7/2001 | Buckmiller et al. | 280/274 |
| 6,655,707 B2 | 12/2003 | Buckmiller et al. | |
| 6,805,372 B2 | 10/2004 | Gueugneaud | |
| RE38,669 E | 12/2004 | Voss et al. | |
| 2005/0012299 A1 | 1/2005 | Schuman et al. | |
| 2005/0248119 A1 | 11/2005 | Callahan et al. | |
| 2007/0170690 A1 | 7/2007 | Hermansen et al. | |
| 2007/0210554 A1 | 9/2007 | Callahan et al. | |
| 2007/0257466 A1 | 11/2007 | Murphy et al. | |
| 2008/0029993 A1 | 2/2008 | Callahan et al. | |
| 2008/0303240 A1 * | 12/2008 | Lewis et al. | 280/276 |
| 2009/0160156 A1 * | 6/2009 | Yu | 280/276 |

* cited by examiner

Primary Examiner — Lesley Morris
Assistant Examiner — Marlon A Arce
(74) Attorney, Agent, or Firm — Boyle Fredrickson, S.C.

(57) ABSTRACT

A fork assembly for a bicycle includes a pair of forks and a steerer tube that extend in generally opposite directions from a fork crown. The assembly includes first and second means for securing the steerer tube to the fork crown. Preferably, the steerer tube is threaded and bonded to the fork crown. The fork crown includes a pair of cavities that each slidably receives a respective fork. Preferably, each fork is formed of a carbon fiber material and has an end whose shape substantially matches a shape of a respective cavity formed in the crown. The forks and crown cavities cooperate to efficiently communicate loads between the forks and the fork crown while maintaining a lightweight and robust fork, fork crown, and steerer tube assembly.

21 Claims, 4 Drawing Sheets

BICYCLE FORKS, CROWN, AND STEERER TUBE ASSEMBLY

BACKGROUND OF THE INVENTION

The present invention relates generally to bicycles and, more particularly, to a light weight multi-material fork and steerer tube assembly.

A typical fork assembly generally includes a fork crown that is constructed to engage a pair of downward extending forks. A steerer tube is constructed to engage mating structure and be secured to the fork crown so as to extend in a direction generally opposite the pair of forks. Typically, the steerer tube and fork crown are constructed of aluminum or metal-type materials whereas the forks, or at least a portion thereof, may be constructed of a composite material and/or a carbon based material such as carbon fiber material and/or a glass fiber material. The fork crown is often two dimensionally forged and then machined to a proximate finish or net shape. The fork crown commonly extends in opposite lateral directions relative to the axis of the steerer tube.

The fork crown is frequently formed with a pair of protrusions positioned on generally opposite sides of the fork crown relative to the steerer tube. The protrusions are commonly constructed to engage the inside of the composite fork legs. The faces of the protrusions increase the surface area of the interface between the aluminum or metal material fork crown and the composite forks. Such a construction provides a greater bonding area between the two components.

Once fully assembled and bonded, the assembly is again machined to ensure a generally smooth transition between the fork crown and the fork legs thereby providing an aesthetic and aerodynamic finish. In addition to the exterior surface machining, a surface of a cavity of each fork leg is also commonly machined to ensure a relatively consistent bond-gap between a respective fork leg and the respective protruding portion of the fork crown.

Each fork blade or leg is typically made from a carbon fiber and/or glass fiber material that is held together with an epoxy resin matrix. Such fork blades are typically molded using matched female tooling and a pressure-generating material or pressurized bladder that is configured to form the general shape of the cavity of each fork leg such that each cavity is configured to snuggly receive the corresponding protrusion of the fork crown. This construction and preparation of such a fork assembly and the fork assembly components is time consuming and labor intensive.

Construction of the steerer tube also commonly requires extensive manufacturing processes to ensure a secure engagement between the steerer tube and the fork crown. An inner diameter of the steerer tube is commonly stepped or tapered and is formed using a butting process that is well-known to steerer tube manufacture. The steerer tube also includes a plug end that is constructed for bonding the steerer tube to the fork crown. The plug end is generally formed after the butting process and is typically done by swaging the end of the steerer tube that engages the fork crown.

Although such a known manufacturing and assembly process generates a fork assembly that is aesthetically pleasing and fairly robust, such fork assemblies are not without their drawbacks. The assembly provides a relatively heavy fork assembly having a fork crown and steerer tube constructed of a relatively solid aluminum material. The fork crown and steerer tube are commonly constructed of metal-type materials and sized to withstand the stresses and strains associated with bicycle operation. The size and material of the steerer tube assembly undesirably contributes to the overall weight of the bicycle. Furthermore, due to stress concentrations associated with the interface of the steerer tube and the fork crown, additional material is commonly associated with this interface area thereby further undesirably increasing the mass of the fork assembly. Understandably, the weight of the steerer tube and fork subassembly is an important consideration of bicycle design. Riders commonly prefer a bicycle that is lightweight and can provide the performance to which they are accustomed.

The fairly complex manufacture of such fork assemblies also presents several undesirable manufacturing attributes. The multiple machining and complex forging, molding, or casting requirements of such assemblies increases the cost associated with producing each unit. Whereas the pre and post bond machining of the fork assembly components ensures a generally uniform and repeatable assembly, such manufacturing processes have a greater than ideal per unit cycle time. Although the post bond machining of the crown race ensures that the fork crown is constructed to be concentrically supported by a bicycle frame relative to the steerer tube, these extensive production procedures also increase the per unit assembly time as well as the requisite skill level of assembly and manufacturing personnel.

Therefore, it would be desirable to have a fork and steerer tube assembly that is both robust and lightweight. It is further desired to provide a method of forming a fork assembly whose components can be efficiently and repeatably produced and assembled.

BRIEF DESCRIPTION OF THE INVENTION

The present invention provides a system and method of forming a bicycle fork assembly that overcomes the aforementioned drawbacks. A method of forming a bicycle fork assembly according to one aspect of the invention includes securing a steerer tube to a fork crown with a bonded connection and a threaded connection between the steerer tube and the fork crown. The multiple modes of securing the steerer tube to the fork crown forms a fork assembly with greater manufacturing tolerances and that is robust and lightweight.

A fork assembly for a bicycle according to another aspect of the invention useable with one or more of the above aspects includes a pair of forks and a steerer tube that extend in generally opposite directions from a fork crown. The assembly includes first and second means for securing the steerer tube to the fork crown. Preferably, the steerer tube is threaded and bonded to the fork crown. The fork crown includes a pair of cavities that each slidably receives a respective fork. Preferably, each fork is formed of a carbon fiber material and has an end whose shape substantially matches a shape of a respective cavity formed in the crown. The forks and crown cavities cooperate to efficiently communicate loads between the forks and the fork crown while maintaining a lightweight and robust fork, fork crown, and steerer tube assembly.

A bicycle fork assembly combinable with one or more of the above aspects includes a fork crown that has an upward facing side and a downward facing side. A steerer tube passage is formed through the fork crown and extends between the upward and downward facing sides. The fork crown includes a pair of blind fork openings that open in the downward facing side of the fork crown and are on laterally opposite sides of the steerer tube passage. The fork assembly includes a pair of forks and a steerer tube that extend outward from the fork crown. A first end of each fork slidably cooperates with one of the pair of blind fork openings of the fork crown such that each fork extends away from the downward facing side of the fork crown. The steerer tube cooperates with the steerer tube passage and extends away from the upward facing side of the fork crown. The assembly includes first means and second means that is different than the first means for securing the steerer tube to the fork crown.

Another aspect of the invention usable with one or more features of the above aspects discloses a bicycle assembly that includes a frame assembly having a head tube and that is constructed to support a rear wheel and a seat. The bicycle includes a front wheel support assembly having a steerer tube that is constructed to be rotationally supported in the head tube of the frame assembly. The front wheel support assembly includes a fork crown that is secured to an end of the steerer tube and positioned generally below the head tube. The fork crown includes a steerer tube passage for securely receiving the steerer tube and a pair of fork cavities. The fork cavities are formed in the fork crown and positioned outboard of the steerer tube passage such that the fork cavities are generally mirror images of one another. An outboard wall and an inboard wall are formed about each fork cavity such that each fork cavity includes an inboard and outboard wall pair. Each outboard wall extends about a greater portion of a perimeter of a respective fork cavity than a respective inboard wall and the outboard walls extend a greater distance in a direction generally aligned with an axis of the steerer tube than the inboard walls. A fork is engaged with each fork cavity of the fork crown. Each fork is formed of a different material than the fork crown and has a first end that has a shape that substantially matches a shape of a respective fork cavity and inboard and outboard wall pair.

Preferably, one or more of the aspects above includes securing the steerer tube to the fork crown with a bonded and threaded connection. Preferably, the first securing means resists axial translation of the steerer tube relative to the fork crown and the second securing means resists rotational translation of the steerer tube relative to the fork crown. More preferably, the threaded connection is formed nearer a downward facing side than an upward facing side of the fork crown. Still more preferably, the threaded and bonded connections overlap one another.

Another aspect of the invention useable with one or more of the above aspects includes forming each of the pair of forks from of a non-metallic or a carbon fiber type material. Preferably, each fork opening is generally kidney shaped or has a generally curved shape that curves about the steerer tube passage. Preferably, a lateral wall extends about an outboard side of each fork opening in a direction between the upward and downward facing sides of the fork crown. A projection is generally aligned with the lateral wall associated with each fork opening and extends from the fork crown proximate the steerer tube passage. A pair of open spaces is positioned between opposite ends of the projection and each respective lateral wall. Each fork cooperates with the inboard and outboard projections associated with a respective cavity.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
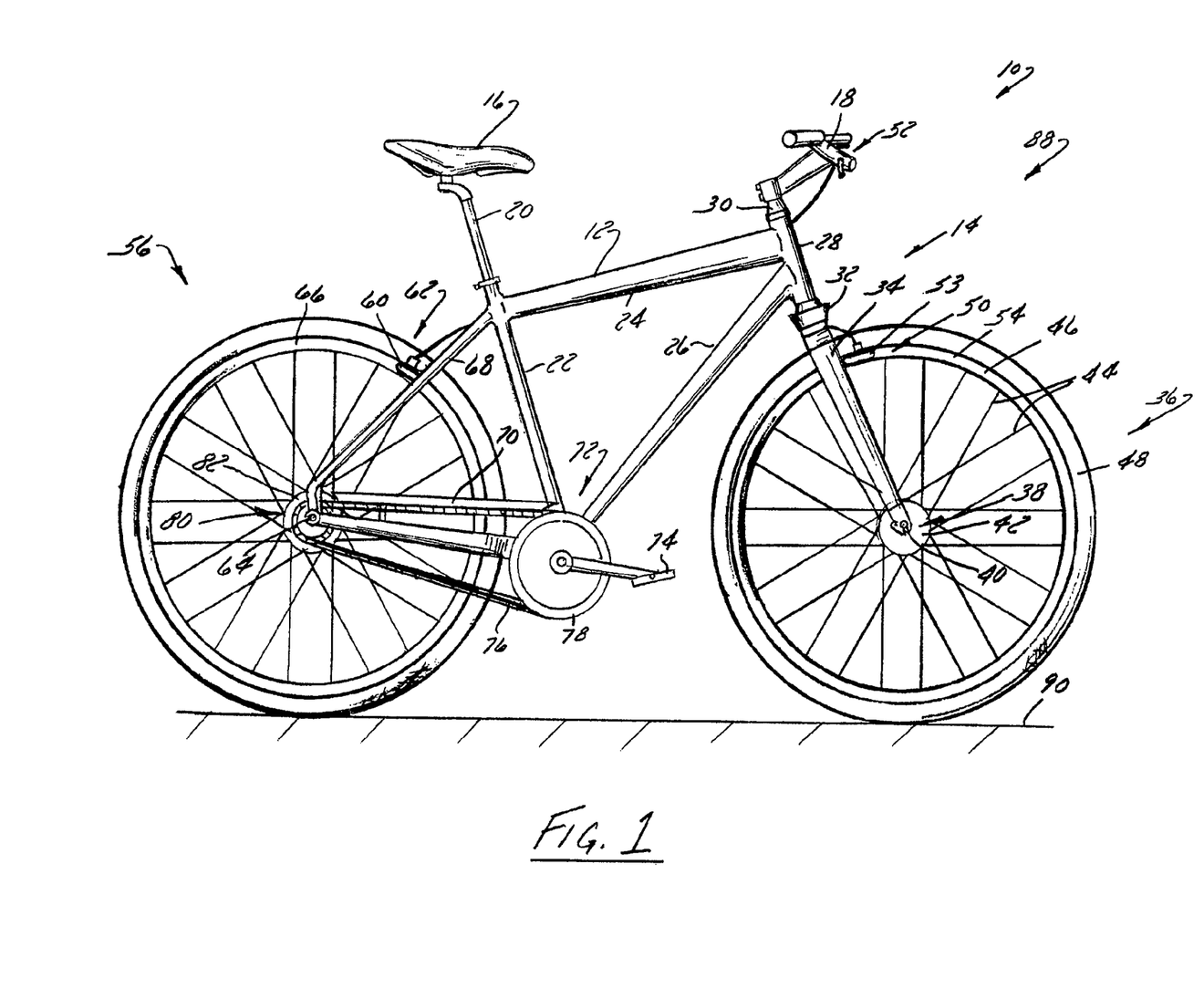
FIG. 1 is an elevational view of the bicycle equipped with a fork assembly according to the present invention.

FIG. 1 shows a bicycle 10 having a frame 12 constructed to accommodate a fork assembly 14 according to the present invention. Bicycle 10 includes a seat 16 and handlebars 18 that are attached to frame 12. A seat post 20 is connected to seat 16 and slidably engages a seat tube 22 of frame 12. A top tube 24 and a down tube 26 extend forwardly from seat tube 22 to a head tube 28 of frame 12. Handlebars 18 are connected to a stem or steerer tube 30 that passes through head tube 28 and is fixedly connected to a fork crown 32 of fork assembly 14. Understandably, handlebar 18 may include a stem that is constructed to slidably engage an interior cavity of steerer tube 30. Regardless of the specific configuration, handlebar 18 is attached to bicycle 10 such that rotation of handlebar 18 rotates fork crown 32 about steerer tube 30.

Fork assembly 14 includes a pair of forks, fork blades or fork legs 34 that extend from generally opposite ends of fork crown 32 and are constructed to support a front wheel assembly 36 at an end thereof or dropout assembly 38. Dropout assemblies 38 engage generally opposite sides of an axle 40 that is engaged with a hub 42 of front wheel assembly 36. A number of spokes 44 extend from hub 42 to a rim 46 of front wheel assembly 36. A tire 48 is engaged with rim 46 such that rotation of hub 42 and rim 46, relative to fork legs 34, rotates tire 48.

Bicycle 10 includes a front brake assembly 50 having an actuator 52 attached to handlebars 18 and a pair of brake pads 53 positioned on generally opposite sides of front wheel assembly 36. Brake pads 53 are constructed to engage a brake wall 54 of rim 46 thereby providing a stopping or slowing force to front wheel assembly 36. Bicycle 10 includes a rear wheel assembly 56 that is also equipped with a brake assembly 58. Brake assembly 58 includes a pair of brake pads 60 that are manipulated by a caliper 62 that extends about generally opposite lateral sides of a rear wheel assembly 58. Rear wheel assembly 58 includes a rear wheel 66 that is supported by a rear axle 64. Rear wheel brake assembly 58 interacts with rear wheel 66 in a manner similar to the association of front brake assembly 50 and front wheel assembly 36. Brake assemblies 50, 58 are merely exemplary of one brake assembly useable with the present invention. It is appreciated that either or both of front and rear wheel assemblies 36, 56 could be provided with other braking arrangements such as disc brake assemblies.

A seat stay 68 and a chain stay 70 offset rear axle 64 from a crankset 72. Crankset 72 includes a set of pedals 74 that is operationally connected to a chain 76 via a gear set, chain ring, or sprocket 78. Rotation of chain 76 communicates a drive force to a gear cluster 80 positioned proximate rear axle 64. Gear cluster 80 is generally concentrically orientated with respect to rear axle 64 and includes a number of variable diameter gears.

Gear cluster 80 is operationally connected to a hub 82 of rear wheel 66. A number of spokes 84 extend radially between hub 82 and a rim 86 of rear wheel 66 of rear wheel assembly 56. As is commonly understood, rider operation of pedals 74 drives chain 76 thereby driving rear wheel 66 which in turn propels bicycle 10. Fork assembly 14 is constructed to support a forward end 88 of bicycle 10 above a ground surface 90. Handlebar 18 is connected to frame 12 and fork assembly 14 such that operator manipulation of handlebar 18 is communicated to fork assembly 14 to facilitate rotation of front wheel assembly 36 relative to frame 12 along a longitudinal axis of bicycle 10. As is commonly understood, such manipulation of handlebar 18 steers bicycle 10 during riding.

Understandably, the construction of bicycle 10 shown in FIG. 1 is merely exemplary of a number of bicycle configurations. That is, whereas bicycle 10 is shown as what is commonly understood as a street or road bike, it is appreciated that fork assembly 14 is applicable to other bicycle configurations such as mountain and/or dirt bikes. It is further appreciated that fork assembly 14 and the method of providing fork assembly 14 is applicable to any of a number of vehicle configurations in addition to the bicycle configuration shown.

FIGS. 2-8 show fork assembly 14, or portions thereof, removed from bicycle 10. Each fork leg 34 includes a body 92 that extends between a first end or fork crown end 94 proximate fork crown 32 and a second end or wheel end 96 that cooperates with a dropout 98 thereby forming each respective dropout assembly 38. As described further below, each dropout assembly 38 is constructed to cooperate with respective opposite ends of axle 40 of front wheel assembly 36 such that front wheel assembly 36 can be selectively removed from bicycle 10.

Figures 2, 3:
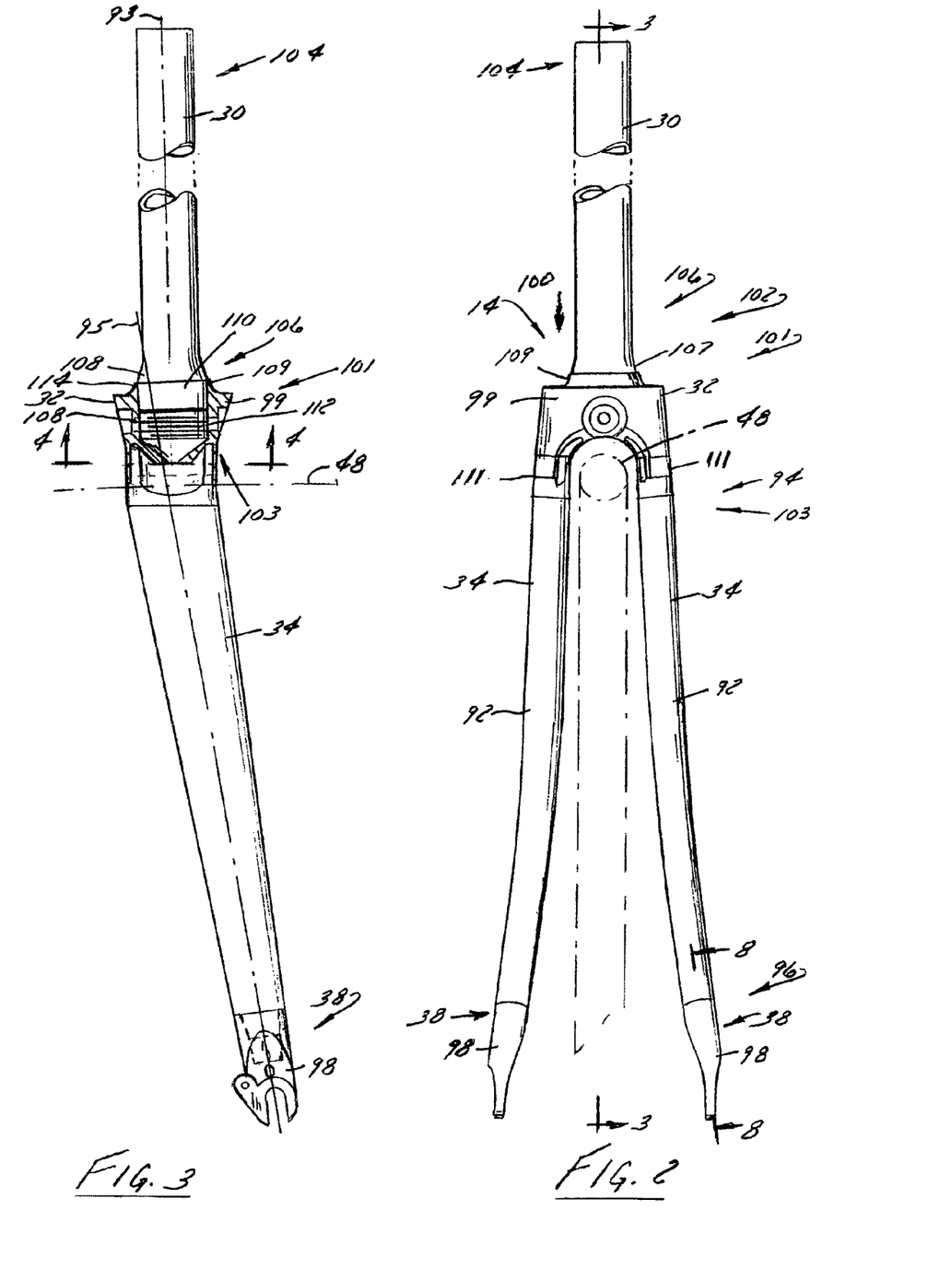
FIG. 2 is a front elevation view of the fork assembly of FIG. 1.
FIG. 3 is a partial cross-sectional view of the fork assembly taken along line 3-3 shown in FIG. 2.

As shown in FIG. 2, fork crown 32 includes a generally unitary body 99 having a first arm 100 and a second arm 102 that are each constructed to receive a fork crown end 94 of a respective fork leg 34. Fork crown 32 includes an upward facing side 101 and a downward facing side 103. Preferably, fork crown 32 is formed of a metal material. More preferably, fork crown 32 is die cast of an aluminum alloy material. Steerer tube 30 is attached to fork crown 32 and extends from body 99 of fork crown 32 in an upward direction, or a direction generally opposite the direction fork legs 34 extend from crown 32. Preferably, steerer tube 30 is also formed of a metal material and more preferably, steerer tube 30 is formed of a wrought aluminum material and/or alloy.

Steerer tube 30 is connected to fork crown 32 so as to be permanently connected thereto. Steerer tube 30 includes a first end 104 constructed to operationally engage handlebar 18 and a second end or crown end 106 that extends into, and is secured to, fork crown 32. A contour 107 is formed proximate second end 106 of steerer tube 30 and a bearing race 109 is formed between contour 107 and fork crown 32. Race 109 is constructed to engage a bearing disposed between fork assembly 14 and head tube 28 of bicycle frame 12. Preferably, race 109 is formed after steerer tube 30 is secured to crown 32. More preferably, race 109 is finish machined. Race 109 may be constructed to support a bearing positioned thereabout or otherwise directly engage head tube 28 of frame 12. Such constructions ensure a robust interface between fork assembly 14 and bicycle 10. Additionally, such a construction allows a bearing to directly engage fork assembly 14 rather than requiring a separate race disposed therebetween. It is further envisioned that race 109 may also be processed, such as by shot or peen hardening, to enhance the wear resistance of the race.

Fork leg bodies 92 are constructed of non-metallic material whereas steerer tube 30 and fork crown 32 are constructed of a metal based materials. Preferably, bodies 92 are constructed of a carbon-type material. Preferably, fork legs 34 are formed of a composite material that includes one or more of carbon glass fiber, carbon fiber, glass fiber, resin, and epoxy. More preferably, bodies 92 are formed of carbon fiber material. An interface 111 is formed at the connection between each fork leg 34 and fork crown 32 and provides a visible indication of the composite nature of fork assembly 14.

Figures 4, 5:
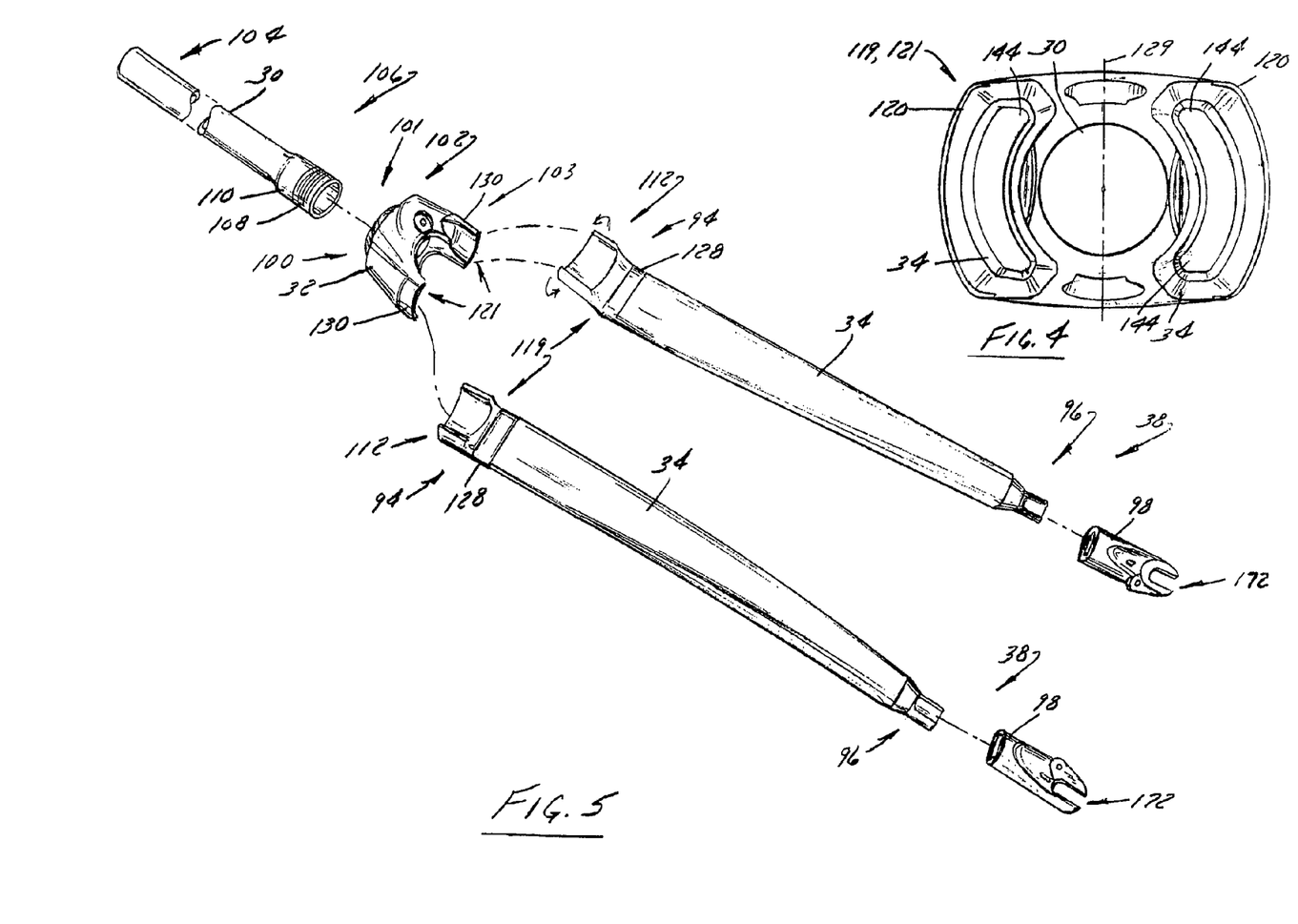
FIG. 4 is a cross-sectional view of an interface of a fork and the fork crown taken along line 4-4 shown in FIG. 3.
FIG. 5 is an exploded view of the fork assembly shown in FIG. 3.

As shown in FIG. 3, when engaged with fork crown 32, steerer tube 30 is aligned along a first longitudinal axis 93 and forks 34 are aligned along a second longitudinal axis 95. Axis 93, 95 are oriented in crossing directions relative to one another such that forks 34 extend in a forward and downward direction relative to steerer tube 30. Referring to FIGS. 3 and 5, the second end or fork crown end 106 of steerer tube 30 includes a threaded section 108 and a bonding section 110. As shown in FIG. 3, threaded section 108 and bonding section 110 of steerer tube 30 are positioned along steerer tube 30 so as to cooperate with a threaded portion 112 and a bonding portion 114 of fork crown 32. Steerer tube 30 is secured to fork crown 32 with first securing means (the interaction of threaded section 108 and threaded portion 112) and second securing means (the interaction of bonding section 110 and bonding portion 114) such that the steerer tube extends from upward facing side 101 of fork crown 32. It is envisioned that the threaded connection and the bonded connection extend similar lengths of the interface between steerer tube 30 and fork crown 32 or that one of the threaded or bonded connections extends a greater length of the interface between steerer tube 30 and fork crown 32 than the other of the threaded or bonded connections.

Preferably, at least a portion of the first and second securing means overlap one another. More preferably, the mating threads associated with the threaded interaction between steerer tube 30 and fork crown 21 is also glued or bonded. Preferably, mating M35 X 1.0 threads are formed on each of steerer tube 30 and fork crown 32. As shown in FIG. 3, when assembled, threaded section 108 is nearer downward facing side 103 of fork crown 32 than bonding section 110. The two distinct securing means between steerer tube 30 and fork crown 32 provides for a permanent connection therebetween and a connection that is both lightweight and that requires less intensive and precise pre-assembly processing. The threaded connection is better configured to withstand axial loads and the bonded connection is better configured to withstand rotational loads that are communicated between steerer tube 30 and fork crown 32. Furthermore, providing two securing means over a length of the interface between steerer tube 30 and fork crown 32 allows the total length of the interface to be shortened thereby providing a lighter steerer tube and fork crown assembly than can previously be provided. Furthermore, by providing overlapping securing means, each securing means contributes to the integrity of the other of the securing means. That is, the threaded securing means increases the surface area available for bonding and limits the axial loading that the bonding must withstand. Accordingly, the connection between steerer tube 30 and fork crown 32 is robust and can be provided in an economical manner.

Figure 6:
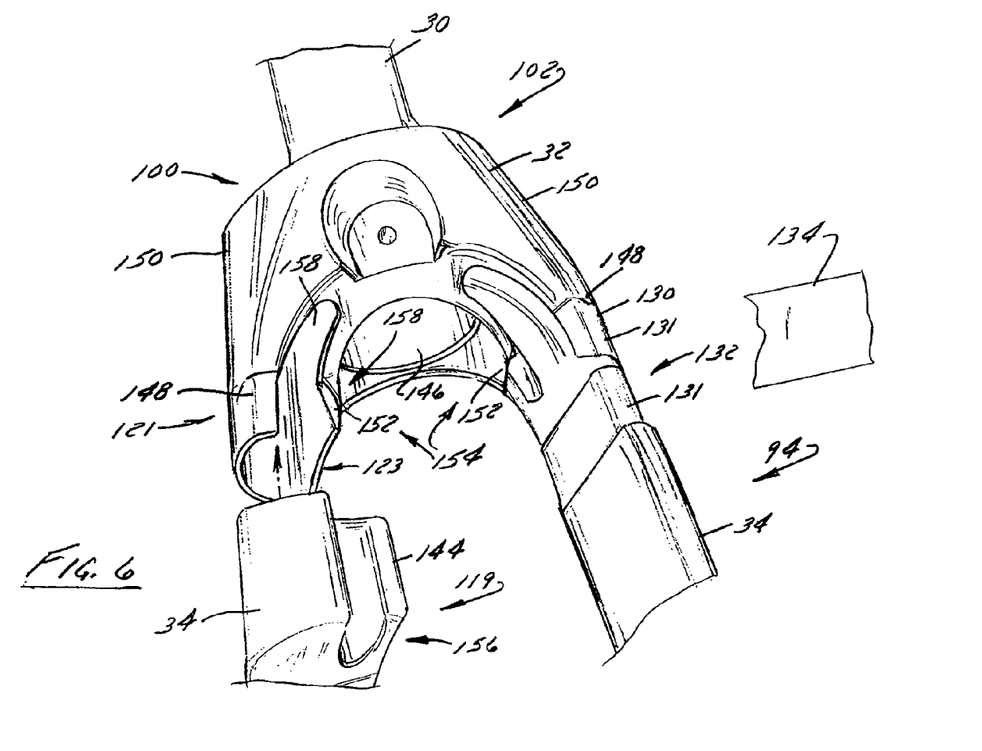
FIG. 6 is a detailed perspective view of a crown area of the fork assembly shown in FIG. 3 with one of the forks removed from the fork crown.

FIGS. 4-8 show the interaction of each fork leg 34 with fork crown 32 and dropout assemblies 38. As shown in FIGS. 4 and 5, fork crown end 94 of each fork leg 34 includes a contour 119 constructed to generally match a contour 121 of a cavity 123 formed in each arm 100, 102 of fork crown 32. Contours 119, 121 are constructed to cooperate to define the orientation of each fork leg 34 relative to respective arms 100, 102 of fork crown 32. As best shown in FIGS. 4-6, contours 119, 121 are constructed to substantially match one another such that fork legs 34 are received in cavities 123 and can thereby be bonded to fork crown 32.

Cavities 123 extend a majority of a depth of arms 100, 102 and thereby increase the bonding surface area between legs 34 and fork crown 32. Cavities 123 and fork crown ends 94 are also contoured to prevent axial rotation of fork legs 34 relative to fork crown 32. As best shown in FIG. 4, contours 119, 121 have a curved shape or a generally C-shape or kidney shape so as to increase the surface area associated with bonding each fork 34 to the fork crown 32. Furthermore, as the bonded interfaces of fork legs 34 and fork crown 32 are internal to the finished assembly, the bonded portions of fork legs 34 and fork crown 32 do not require any considerable pre-bond machining to ensure a generally uniform bond interface. That is, as the bond is formed between mating faces of molded parts, any bond gap can be more readily monitored and manipulated during the manufacturing process to provide a generally consistent bond gap. As clearly shown in FIG. 4, generally opposite lateral sides of fork assembly 14 are generally mirror images of one another about a plane 129 that is vertically aligned with respect to a longitudinal axis of steerer tube 30.

Contours 119, 121 can be shaped such that an outer surface 128 of fork legs 34 is generally aligned with an outer surface 130 of fork crown 32 when fork legs 34 are secured or otherwise bonded thereto. That is, an outer contour of the cast fork crown proximate the blind or not through opening of each of cavities 123 substantially matches an outer contour of a portion of the fork leg 34 positioned generally adjacent the opening. Such a construction reduces, if not completely eliminates, machining of fork assembly 14 after the fork legs 34 have been bonded or otherwise secured to fork crown 32. Such a construction also forms a generally continuous and relatively planar exterior surface of fork assembly 14. The reduced post bonding manipulation of fork assembly 14 reduces manufacturing expenses associated with fork assembly production as well as provides a fork assembly that is highly aerodynamic.

Alternatively, if a more robust connection is desired, as shown in FIG. 6, outer surfaces 128, 130 of each fork leg 34 and crown cavity 123 can each include a land or flat 131 that cooperate with one another to form a relatively shallow channel 132 that extends about the interface of each leg 34 and crown 32. A ribbon 134, preferably formed of a flexible carbon fiber material, can be wrapped and bonded about the joint between each leg 34 and crown 32. Ribbon 134 is configured to be received in channel 132 so as to form a substantially planar interface between crown 32 and each leg 34 and such that a portion of crown 32 is disposed between leg 34 and ribbon 134. Such a configuration enhances the robustness of the connection between each leg 34 and crown 32.

As best shown in FIGS. 4 and 6, the crown end 94 of each fork leg 34 is generally cupped shaped and includes a pair of ribs 144. Ribs 144 face toward steerer tube 30 or toward the ribs of the opposite fork leg 34. As shown in FIG. 4, the generally opposite lateral sides of the As best shown in FIG. 6, fork crown 32 includes a steerer tube opening 146 that is generally centrally positioned between the cavities 123 formed in each arm 100, 102 of the fork crown 32. Each cavity 123 is defined by a lateral wall 148 that extends about an outboard side 150 of each fork opening. Each lateral wall 148 extends in a direction between the upward facing side 101 and downward facing side 103 of fork crown 32.

Fork crown 32 includes a projection 152 that extends in a downward direction proximate an inboard side 154 of each cavity 123. Each projection 152 is generally aligned with the lateral wall 148 of the respective cavity 123 and extends from fork crown 32 proximate steerer tube opening 146. As shown in FIG. 6, each outboard lateral wall 148 extends a greater degree of the circumference of the cavity 123 and further in a downward direction than the inboard positioned projection 152 of the corresponding cavity 123. Such a construction enhances the lateral stiffness of the interaction between fork crown 32 and each respective fork leg 34.

Each projection 152 cooperates with a channel 156 formed in the corresponding fork leg 34 between the respective pair of ribs 144. A pair of open spaces 158 is formed on generally opposite sides of each projection 152 between the projection 152 and the corresponding outboard lateral wall 148. Open spaces 158 are shaped to slidably cooperate with the ribs 144 of the corresponding fork leg 34. Such a construction provides an index for orienting the respective fork leg 34 and cavity 123 so as to generally prevent motion between the respective fork leg 34 and fork crown 32 except for in a direction along an insertion axis prior to the bonding together of each fork 34 and fork crown 32. Such a construction also increases the surface area associated with the interface between each respective fork 34 and fork cavity 123.

Figure 7:
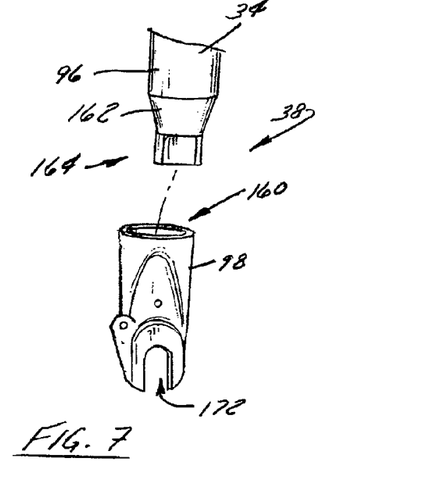
FIG. 7 is an exploded view of a dropout assembly of the fork assembly shown in FIG. 2.
Figure 8:
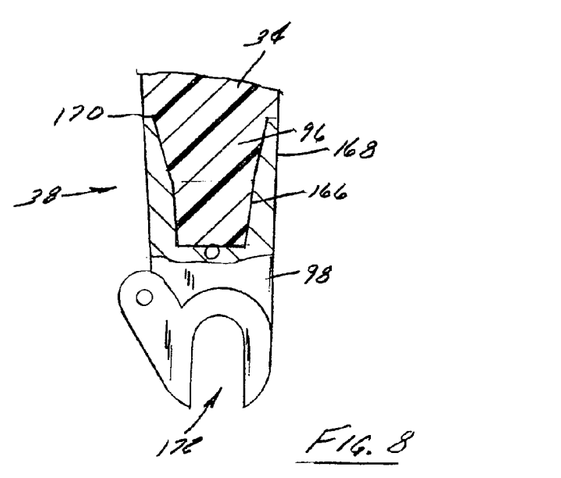
FIG. 8 is a cross-sectional of a dropout assembly taken along line 8-8 shown in FIG. 2.

Referring to FIGS. 7 and 8, each dropout assembly 38 includes a dropout 98 that is bonded to the wheel end 96 of each fork leg 34. Each dropout 98 includes an upward facing cavity 160 whose shape generally corresponds to the shape of wheel end 96 of each fork leg 34. Each wheel end 96 of each fork leg 34 extends through a tapered portion 162 and terminates with a generally C-shaped portion 164. Tapered portion 162 and C-shaped portion 164 are slidably received in cavity 160 of dropout 98. As shown in FIG. 8, cavity 160 is shaped to generally correspond to the shape of tapered portion 162 and C-shaped portion 164 such that a generally continuous interface 166 is formed between each dropout 98 and corresponding fork leg 34. Furthermore, each dropout 98 cooperates with a respective fork leg 34 so as provide a generally continuous and smooth exterior surface 168 even across an exterior edge 170 of interface 166.

Still referring to FIG. 8, each dropout 98 includes a downward facing channel 172 that slidably cooperates with front wheel assembly 36 (FIG. 1). The contoured shape of the interaction of between each fork leg 34 and each of dropout 98 and fork crown 32 ensures that the channel 172 of the dropout 98 of each respective fork leg 34 is generally aligned with the channel 172 of the other fork of fork assembly 14. That is, as there is only one orientation that each fork leg 34 cooperates with each or fork crown 32 and dropout 98, fork assembly 14 can be expeditiously assembled with all of the respective components in the proper orientation for cooperation with a bicycle. Accordingly, in addition to being lightweight and robust, fork assembly 14 is also economical and efficient to manufacture and assemble.

Therefore, one embodiment of the invention includes a method of forming a bicycle fork assembly that includes securing a steerer tube to a fork crown with a bonded connection and a threaded connection between the steerer tube and the fork crown.

Another embodiment of the invention usable with one or more features of the above embodiment includes a bicycle fork assembly having a fork crown that has an upward facing side and a downward facing side. A steerer tube passage is formed through the fork crown and extends between the upward and downward facing sides. The fork crown includes a pair of blind fork openings that open in the downward facing side of the fork crown and are on laterally opposite sides of the steerer tube passage. The fork assembly includes a pair of forks and a steerer tube that extend outward from the fork crown. A first end of each fork slidably cooperates with one of the pair of blind fork openings of the fork crown such that each fork extends away from the downward facing side of the fork crown. The steerer tube cooperates with the steerer tube passage and extends away from the upward facing side of the fork crown. The assembly includes first means and second means that is different than the first means for securing the steerer tube to the fork crown.

Another embodiment of the invention usable with one or more features of the above embodiments includes a bicycle assembly having a frame with a head tube and that is constructed to support a rear wheel and a seat. The bicycle includes a front wheel support assembly having a steerer tube that is constructed to be rotationally supported in the head tube of the frame assembly. The front wheel support assembly includes a fork crown that is secured to an end of the steerer tube and positioned generally below the head tube. The fork crown includes a steerer tube passage for securely receiving the steerer tube and a pair of fork cavities. The fork cavities are formed in the fork crown and positioned outboard of the steerer tube passage such that the fork cavities are generally mirror images of one another. An outboard wall and an inboard wall are formed about each fork cavity such that each fork cavity includes an inboard and outboard wall pair. Each outboard wall extends about a greater portion of a perimeter of a respective fork cavity than a respective inboard wall and the outboard walls extend a greater distance in a direction generally aligned with an axis of the steerer tube than the inboard walls. A fork is engaged with each fork cavity of the fork crown. Each fork is formed of a different material than the fork crown and has a first end that has a shape that substantially matches a shape of a respective fork cavity and inboard and outboard wall pair.

The present invention has been described in terms of the preferred embodiment, and it is recognized that equivalents, alternatives, and modifications, aside from those expressly stated, are possible and within the scope of the appending claims.

What is claimed is:

1. A bicycle fork assembly comprising:
a fork crown having an upward facing side and a downward facing side;
a steerer tube passage formed through the fork crown and extending between the upward and downward facing sides;
a pair of blind fork openings that open in the downward facing side of the fork crown and are on laterally opposite sides of the steerer tube passage;
a pair of forks wherein a first end of each fork slidably cooperates with one of the pair of blind fork openings and extends away from the downward facing side of the fork crown;
a steerer tube that cooperates with the steerer tube passage and extends away from the upward facing side of the fork crown;
first means for securing the steerer tube to the fork crown; and
second means that is different than and independent the first means for securing the steerer tube to the fork crown so that the first securing means is stronger in axial loading than the second securing means and the second securing means is stronger in torsional loading than the first securing means.

2. The bicycle fork assembly of claim 1 wherein the first securing means is further defined as a threaded connection and the second securing means is further defined as a bonding connection between the steerer tube to the fork crown.

3. The bicycle fork assembly of claim 2 wherein the threaded connection is nearer the downward facing side of the fork crown than the upward facing side of the fork crown.

4. The bicycle fork assembly of claim 1 wherein the pair of forks are formed of one of a non-metallic or a carbon fiber type material.

5. The bicycle fork assembly of claim 1 wherein the first securing means resists axial translation of the steerer tube relative to the fork crown and the second securing means resists rotational translation of the steerer tube relative to the fork crown.

6. The bicycle fork assembly of claim 1 further comprising a dropout bonded to a second end of each fork.

7. The bicycle fork assembly of claim 1 wherein each fork opening has a generally curved shape that curves about the steerer tube passage.

8. The bicycle fork assembly of claim 7 wherein the fork crown further comprises:
a lateral wall that extends about an outboard side of each fork opening in a direction between the upward and downward facing sides of the fork crown;
a projection that is generally aligned with the lateral wall associated with each fork opening and that extends from the fork crown proximate the steerer tube passage; and
a pair of open spaces positioned between opposite ends of the projection and a respective lateral wall.

9. The bicycle fork assembly of claim 8 wherein the first end of each fork further comprises a pair of ribs that are received in the pair of open spaces defined by the projection and lateral wall positioned above a respective blind opening.

10. A bicycle assembly comprising:
a frame assembly having a head tube and constructed to support a rear wheel and a seat; and
a front wheel support assembly comprising:
a steerer tube constructed to be rotationally supported in the head tube of the frame assembly;
a fork crown secured to an end of the steerer tube and positioned generally below the head tube, the fork crown comprising:
a steerer tube passage for securely receiving the steerer tube;
a pair of fork cavities formed in the fork crown and positioned outboard of the steerer tube passage, the fork cavities being generally mirror images of one another; and
an outboard wall and an inboard wall formed about each fork cavity, each outboard wall extending about a greater portion of a perimeter of a respective fork cavity than a respective inboard wall, the outboard walls extending a greater distance in a direction generally aligned with an axis of the steerer tube than the inboard walls; and
a fork engaged with each fork cavity of the fork crown, each fork formed of a different material than the fork crown and having a first end that has a shape that substantially matches a shape of a respective fork cavity and inboard and outboard wall pair so that a portion of an inboard facing side of the fork remains exposed when the fork is engaged with the respective fork cavity.

11. The bicycle assembly of claim 10 further comprising first and second means for securing the steerer tube to the fork crown.

12. The bicycle assembly of claim 11 wherein the first securing means is a threaded connection between the steerer tube and the fork crown and the second securing means is a bonded connection between the steerer tube and the fork crown.

13. The bicycle assembly of claim 12 wherein at least a portion of the threaded and bonded connections overlap one another.

14. The bicycle assembly of claim 10 wherein the shape of the first end of each fork and each fork cavity is further defined as a kidney shape of a cross-section taken in a plane generally transverse to an axis of rotation of the steerer tube and wherein a radius of curvature of elongated sides of the kidney shape is inboard with respect to the fork cavities.

15. The bicycle assembly of claim 10 further comprising a flat formed on an outboard side of each outboard wall and a portion of each fork proximate the first ends.

16. The bicycle assembly of claim 15 further comprising a wrap of a material similar to the fork disposed in the flats about each fork and outboard wall.

17. A method of forming a bicycle fork assembly comprising securing a steerer tube to a fork crown with a bonded connection and a threaded connection between the steerer tube and the fork crown.

18. The method of claim 17 further comprising bonding a pair of non-metallic forks into respective cavities of the fork crown so that the each fork extends from the fork crown in a direction generally opposite the steerer tube.

19. The method of claim 18 further comprising shaping each fork and respective cavity to prevent motion between each fork and respective cavity in every direction other than along an axis of translation prior to the bonding of each fork and respective cavity.

20. The method of claim 19 wherein the bonded connection is formed between a greater portion of an axially overlying portion of the steerer tube and fork crown than the threaded connection.

21. The method of claim 20 wherein the bonded connection overlies at least a portion of the threaded connection.

* * * * *